July 5, 1966     W. M. KRISOVITCH     3,258,997
DRILLING DEVICE FOR LATHE TAILSTOCK
Filed Jan. 31, 1964
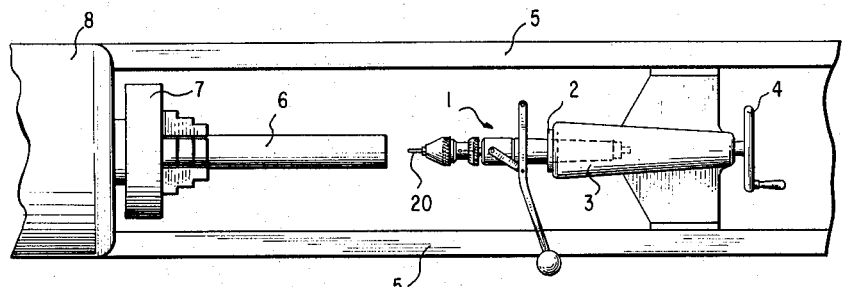
FIG. 1
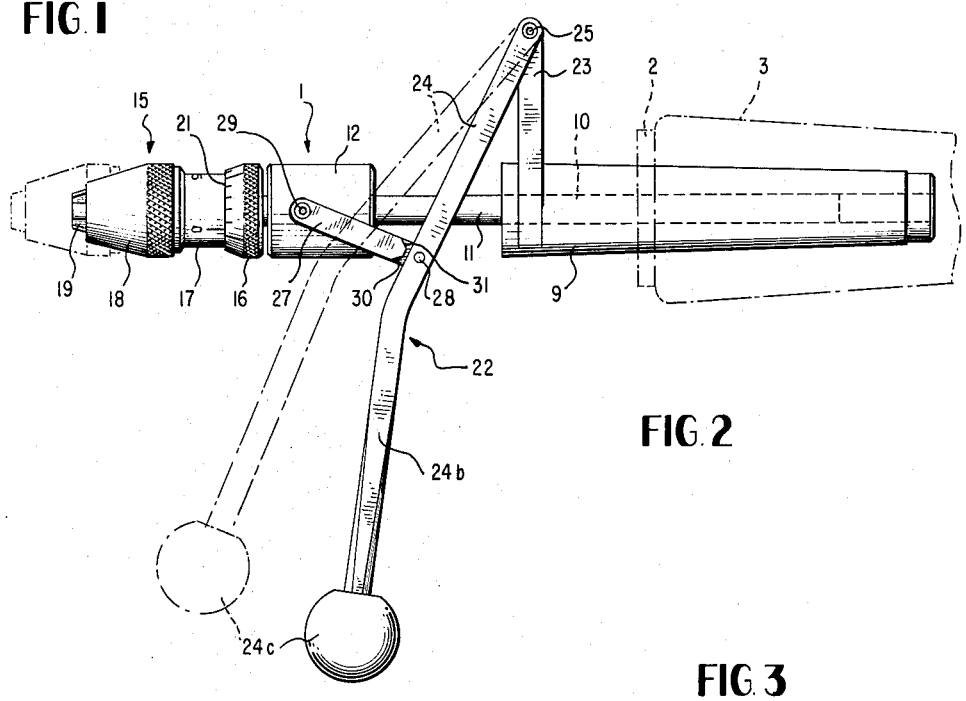
FIG. 2
FIG. 3
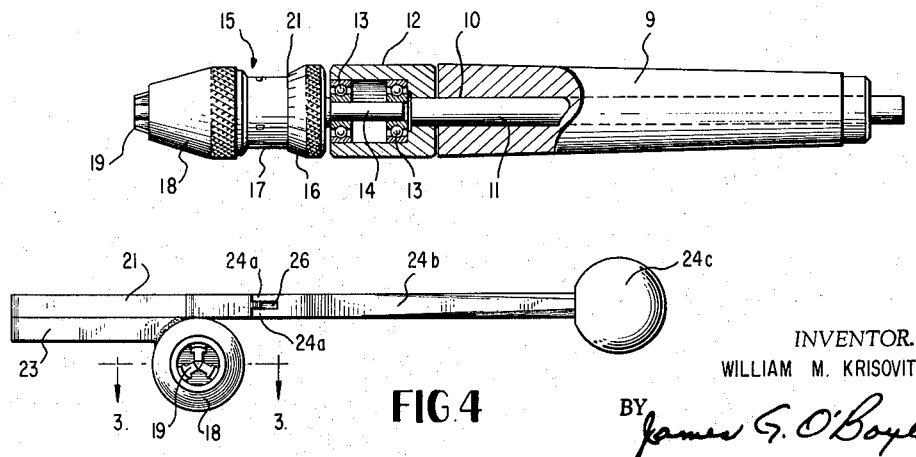
FIG. 4
INVENTOR.
WILLIAM M. KRISOVITCH
BY *James G. O'Boyle*
ATTORNEY

United States Patent Office 3,258,997
Patented July 5, 1966

3,258,997
DRILLING DEVICE FOR LATHE TAILSTOCK
William M. Krisovitch, 1925 Troxell St., Allentown, Pa.
Filed Jan. 31, 1964, Ser. No. 341,716
5 Claims. (Cl. 77—60)

This invention relates to a drilling device, and more particularly to a drilling device adapted to be attached to the tailstock of a lathe.

Heretofore, the tailstock of lathes have been provided with various types of assemblies for drilling an axial bore in a workpiece carried by a chuck driven by the lathe headstock. While these assemblies have been satisfactory for their intended purposes, they have proven to be complicated in design and cumbersome to manipulate, thus preventing the obtaining of close tolerances required in precision machining.

After considerable research and experimentation, the drilling device of the present invention has been devised which is adapted to be attached to the tailstock of a lathe. The drilling device comprises, essentially, a rotatable chuck assembly adapted to be moved axially by means of suitable linkage connected between the chuck assembly and a tapered shank adapted to be inserted within the spindle of the lathe tailstock. By this construction and arrangement, a drill carried by the chuck can be rotated and moved axially to thereby drill a concentric bore of a desired diameter in a rotating workpiece carried by the chuck of the lathe headstock.

An object of the invention is to provide an improved drilling attachment for the tailstock of a lathe.

Another object of the invention is to provide an improved drilling attachment for the tailstock of a lathe wherein, the drilling attachment is provided with a drill chuck adapted to be selectively rotated with or relative to a workpiece.

Yet another object of the invention is to provide an improved drilling attachment for the tailstock of a lathe wherein the drilling attachment is provided with a rotatable drill chuck adapted to be moved axially with respect to a workpiece carried by the lathe headstock, whereby a concentric bore of a desired diameter can be drilled in the workpiece.

Still another object of the invention is to provide an improved drilling attachment for the tailstock of a lathe wherein the drilling attachment is provided with a rotatable drill chuck, and linkage means for moving the drill chuck axially with respect to a workpiece carried by the lathe headstock, whereby a concentric bore of a desired diameter and a predetermined length can be drilled in the workpiece.

A further object of the invention is to provide an improved drilling attachment for the tailstock of a lathe characterized by simplicity in design, rugged in construction, having few moving parts and not likely to get out of order even after long and continued use.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions which, for the purpose of explanation, have been made the subject of illustration.

In the drawings:
FIGURE 1 is a top plan view of the drilling attachment shown mounted in the tailstock of a lathe;
FIGURE 2 is an enlarged top plan view of the drilling attachment;
FIGURE 3 is a view of the drilling attachment, partially in section, taken along line 3—3 of FIGURE 4; and
FIGURE 4 is an end elevational view of the drilling attachment.

Referring to the drawings, and more particularly to FIGURE 1, the drilling attachment, designated generally by reference numeral 1, is shown mounted in the spindle 2 of a lathe tailstock 3 having the conventional handwheel 4 for moving the spindle in and out of the tailstock in the usual manner. The tailstock is slidably mounted on the lathe bed 5 and is provided with lock means (not shown) for properly positioning the tailstock and associated drilling attachment relative to a workpiece 6 carried by the rotatable chuck 7 driven by the lathe headstock 8.

As will be seen in FIGURE 2, the drilling attachment 1, comprises a tapered shank 9 adapted to be frictionally secured within the spindle 2 of the tailstock 3. The tapered shank is provided with an axial bore 10 adapted to slidably receive a rod 11 having one of its ends rigidly secured to a housing 12. Referring to FIGURE 3, a pair of anti-friction bearings 13 are mounted within the housing, the inner races of the bearings being press fit on a shaft 14 carried by a drill chuck assembly 15. The drill chuck assembly includes a knurled collar 16 rotatably mounted on a barrel section 17 having a tapered nose portion 18 housing a plurality of jaws 19 which are adapted to be actuated by the collar 16 for gripping the shank of a drill 20 (FIGURE 1). The drill chuck is further provided with a vernier scale 21 for indicating the size of the drill carried in the chuck and, accordingly, the diameter of the bore being drilled in the workpiece.

By the construction and arrangement of the drilling attachment thus far described, it will be readily seen that the drill chuck 15 is adapted to rotate relative to housing 12, and the housing together with the associated drill chuck are adapted to move axially with respect to the tapered shank 9.

In order to move the drill chuck axially while mounted in the lathe tailstock, a linkage 22 is provided between tapered shank 9 and housing 12. The linkage comprises an outwardly extending arm 23 having one end rigidly secured to the tapered shank 9 and the opposite end having a lever 24 pivotally connected thereto as at 25. The medial portion of the lever is formed with a slot 26 (FIGURE 4) adapted to receive one end of a link 27 pivotally connected to the lever at 28, the opposite end of the link being pivotally connected to housing 12 as at 29. The portion of link 27 adjacent to the pivotal connection 28 is provided with a pair of bevelled surfaces 30 and 31 which cooperate with edge 24a (FIGURE 4) of the lever to limit the outward and inward movement, respectively, of the rod 11 relative to the tapered shank 9. The distal end of lever 24 is provided with a bent portion 24b having a spherical handle 24c threadably secured thereto to facilitate the manipulation of the drilling attachment by the operator.

In the operation of the drilling attachment, with the device mounted on a lathe as shown in FIGURE 1, the tailstock is moved to a position on the lathe bed 5 so that the end of the drill 20 engages the end of the workpiece to be drilled carried by the headstock chuck 7. The headstock is then actuated to cause the workpiece 6 to rotate and, since the drill chuck 15 is free to rotate relative to the housing 12, the drill chuck and associated drill 20 also turn with the rotating workpiece. To drill a hole in the workpiece, the operator places his finger on the rotating chuck 15 to brake the rotation of the chuck thereby causing it to rotate at a slower speed than the workpiece. Simultaneously with the braking of the chuck 15, the operator actuates the lever 24, as shown in dotted lines in FIGURE 2, to move the chuck and associated drill axially to thereby drill a longitudinal bore in the workpiece. The length of the bore is determined by the axial travel of the drill: which travel is limited by the bevelled surface 30 on link 27 abutting the edge 24a of lever 24. After the bore has been drilled, lever 24 is pivoted in the opposite direction to remove the drill from the bore, the outward movement of the drill being limited by the bevelled surface 31 abutting the edge 24a of the lever.

The rotary movement of the chuck 15 and associated drill afforded by the anti-friction bearings 13 allows a seized drill to rotate with the workpiece to thereby preclude drill breakage, and the axial movement of the drill afforded by the linkage results in a drilling device which can rapidly and accurately drill a concentric bore having a specific diameter and a predetermined length.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A drilling device of the character described adapted to be attached to the tailstock of a lathe for drilling an axial bore in a workpiece carried by the lathe headstock comprising a tapered shank adapted to be mounted within a spindle of the lathe tailstock, a rod slidably mounted within said tapered shank, a housing secured to one end of said rod, a shaft rotatably mounted within said housing, a drill chuck assembly connected to one end of said shaft, whereby the chuck assembly is rotatable relative to the housing, and linkage means operatively connected between the housing and the tapered shank, whereby the rod and associated housing and rotatable drill chuck assembly can be moved relative to the tapered shank.

2. A drilling device according to claim 1, wherein the linkage means includes means for limiting the movement of the rod relative to said tapered shank.

3. A drilling device according to claim 1, where in a pair of anti-friction bearings are mounted within the housing, said shaft being press-fit within the inner races of said bearings.

4. A drilling device according to claim 1, wherein the linkage means comprises, an arm secured to said tapered shank, a lever pivotally connected to said arm, and a link, one end of said link being pivotally connected to said lever and the opposite end of the link being pivotally connected to said housing, whereby when the lever is pivoted in one direction the rod moves outwardly from the tapered shank and when the lever is pivoted in the opposite direction the rod moves inwardly of the tapered shank.

5. A drilling device according to claim 4, wherein a slot is formed in said lever, said one end of said link being inserted within said slot, a pair of bevelled surfaces carried by said link in proximity to said one end thereof, whereby when the lever is actuated the bevelled surfaces selectively abut the lever to limit the outward and inward movement of the rod relative to the tapered shank.

No references cited.

WILLIAM W. DYER, JR., *Primary Examiner.*

FRANCIS S. HUSAR, *Examiner.*